US007705730B2

(12) United States Patent
Royer

(10) Patent No.: US 7,705,730 B2
(45) Date of Patent: Apr. 27, 2010

(54) SYSTEM AND METHOD FOR IMPROVING MICROWAVE DETECTOR PERFORMANCE USING RANGING MICROWAVE FUNCTION

(75) Inventor: Gregory Royer, Walworth, NY (US)

(73) Assignee: Robert Bosch GmbH, Stuttgart (DE)

( * ) Notice: Subject to any disclaimer, the term of this patent is extended or adjusted under 35 U.S.C. 154(b) by 378 days.

(21) Appl. No.: 11/715,037

(22) Filed: Mar. 7, 2007

(65) Prior Publication Data

US 2008/0218339 A1 Sep. 11, 2008

(51) Int. Cl.
*G08B 13/18* (2006.01)
(52) U.S. Cl. .................. 340/552; 340/567; 340/554; 340/522; 340/506; 340/540; 340/541; 340/545.3; 342/28; 342/161; 342/162
(58) Field of Classification Search ............... 340/552, 340/567, 554, 522, 506, 540, 541, 545.3; 342/28, 161, 162
See application file for complete search history.

(56) References Cited

U.S. PATENT DOCUMENTS

| | | | |
|---|---|---|---|
| 3,967,283 A * | 6/1976 | Clark et al. ............ | 342/28 |
| RE34,501 E | 1/1994 | Jean et al. | |
| 5,276,427 A | 1/1994 | Peterson | |
| 5,331,308 A | 7/1994 | Buccola et al. | |
| 5,453,733 A | 9/1995 | Peterson et al. | |
| 5,475,365 A | 12/1995 | Hoseit et al. | |
| 5,578,988 A | 11/1996 | Hoseit et al. | |
| 5,581,237 A | 12/1996 | DiPoala | |
| 5,631,639 A | 5/1997 | Hibino et al. | |
| 5,751,211 A | 5/1998 | Shirai et al. | |
| 5,754,099 A | 5/1998 | Nishimura et al. | |
| 5,966,090 A * | 10/1999 | McEwan ............... | 342/27 |
| 6,018,308 A | 1/2000 | Shirai | |
| 6,127,926 A | 10/2000 | Dando | |
| 6,188,318 B1 * | 2/2001 | Katz et al. ............ | 340/545.3 |
| 6,191,688 B1 | 2/2001 | Sprouse | |

(Continued)

FOREIGN PATENT DOCUMENTS

EP 1 873 553 A 1/2008

(Continued)

OTHER PUBLICATIONS

Search Report for corresponding EP Application No. 08400008.2-2215 issued by the European Patent Office on Jul. 21, 2008.

*Primary Examiner*—Tai T Nguyen
(74) *Attorney, Agent, or Firm*—Baker & Daniels LLP

(57) ABSTRACT

Embodiments of the present invention are directed to a method and system for use of ranging MW to decrease MW intrusion detector false alarms. A Doppler microwave system may be provided that is capable of detecting an object range and adjusting the sensitivity of an alarm stage of a MW detector to account for object size and range. Multiple range limited MW stages may be configured for different ranges to determine the general range of the moving object. Based on signal levels present on these MW stages, an approximate object range may be determined. The sensitivity of the MW alarm stage is then adjusted based on a MW alarm state sensitivity vs. object range function that is optimized to alarm on humans and ignore small animals and insects. The method and system may be used in detection systems incorporating a MW sensor.

28 Claims, 7 Drawing Sheets

U.S. PATENT DOCUMENTS

| | | | |
|---|---|---|---|
| 6,239,736 B1 | 5/2001 | McDonald et al. | |
| 6,351,234 B1 | 2/2002 | Choy | |
| 6,380,882 B1* | 4/2002 | Hegnauer | 342/28 |
| 6,720,874 B2 | 4/2004 | Fufido et al. | |
| 2003/0052811 A1* | 3/2003 | Lawless | 342/28 |
| 2004/0140892 A1 | 7/2004 | Hanood | |
| 2004/0160324 A1 | 8/2004 | Stilp | |
| 2005/0024208 A1 | 2/2005 | Maki et al. | |
| 2005/0128067 A1 | 6/2005 | Zakrewski | |
| 2005/0134450 A1 | 6/2005 | Kovach | |
| 2007/0176765 A1* | 8/2007 | Babich et al. | 340/522 |
| 2008/0029703 A1* | 2/2008 | DiPoala | 250/342 |

FOREIGN PATENT DOCUMENTS

| | | |
|---|---|---|
| GB | 2 311 158 A | 9/1997 |
| GB | 2 441 285 A | 2/2008 |
| JP | 2004157102 A | 6/2004 |
| WO | WO 98/34206 A | 8/1998 |
| WO | WO 99/27335 | 6/1999 |
| WO | WO 2006/082405 A | 8/2006 |
| WO | WO 2006/109771 A | 10/2006 |
| WO | WO 2006/137477 A | 12/2006 |
| WO | WO 2007/089413 A2 | 8/2007 |

* cited by examiner

| Detector Range | Insect Bin | | Short Range Bin | | Mid Range Bin | | Long Range Bin | |
|---|---|---|---|---|---|---|---|---|
| | Range | Tinsect | Range | Tshort | Range | Tmid | Range | Tlong |
| 30ft | 3ft | 20nS | 13ft | 40nS | 26ft | 70nS | 30ft | 90nS |
| 40ft | 3ft | 20nS | 13ft | 40nS | 26ft | 70nS | 40ft | 105nS |
| 50ft | 3ft | 20nS | 13ft | 40nS | 36ft | 95nS | 50ft | 130nS |
| 60ft | 3ft | 20nS | 13ft | 40nS | 36ft | 95nS | 60ft | 155nS |

FIG 4

| Detector Range | Target Range | Long Range Bin Thresh. | Target Range | Long Range Bin Thresh. | Target Range | Long Range Bin Thresh. | Target Range | Long Range Bin Thresh. |
| --- | --- | --- | --- | --- | --- | --- | --- | --- |
| 610 | 620 | 630 | 640 | 650 | 660 | 670 | 680 | 690 |
| 30ft | Less than 3ft | 2v | 3 to 13ft | 1.5v | 13 to 26ft | 1.2v | 26 to 30ft | 1v |
| 40ft | Less than 3ft | 2v | 3 to 13ft | 1.5v | 13 to 26ft | 1.2v | 26 to 40ft | 1v |
| 50ft | Less than 3ft | 2v | 3 to 13ft | 1.5v | 13 to 36ft | 1v | 36 to 50ft | 0.5v |
| 60ft | Less than 3ft | 2v | 3 to 13ft | 1.5v | 13 to 36ft | 1v | 36 to 60ft | 0.5v |

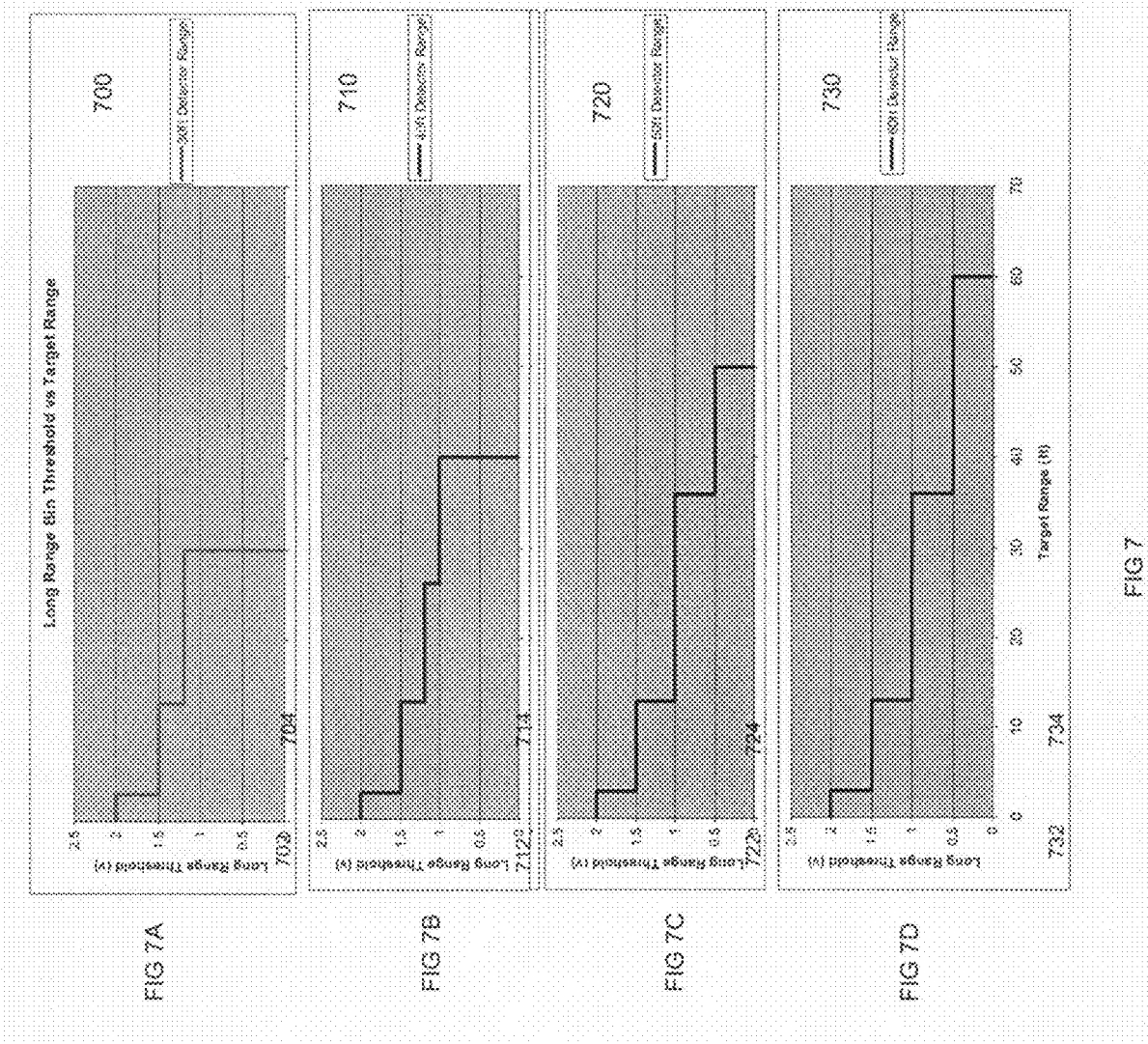

SYSTEM AND METHOD FOR IMPROVING MICROWAVE DETECTOR PERFORMANCE USING RANGING MICROWAVE FUNCTION

TECHNICAL FIELD

Embodiments of the present invention relate to motion detectors. More particularly, embodiments of the invention are directed to using a ranging microwave (MW) system for reducing the occurrence of false alarms and improving the performance of microwave motion detectors.

BACKGROUND OF THE INVENTION

Currently, in the field of security systems, motion detectors are generally provided to detect intruders. Motion detectors often incorporate microwave (MW) technology and/or passive infrared (PIR) technology. Dual technology motion detectors incorporate multiple sensing technologies in order to provide efficient intruder detection with minimized risk of false alarms. Many dual detectors incorporate PIR technology and MW technology.

PIR technology has long been used in motion detectors. The PIR sensor detects the difference between the infrared energy emitted from an intruder and that emitted from the ambient environment. Many PIR detectors utilize Fresnel lenses or custom shaped mirrors to focus infrared energy on a pyrodetector. The output signal from the pyrodetector is then processed via analog hardware and/or digital signal processing. Lenses and mirrors are designed to provide various detection zones emanating radially from the sensor. As a target moves across the PIR detection zones, the sensing elements within the pyrodetector are alternately exposed to the target IF energy, resulting in an alternating voltage output from the PIR sensor. The amplitude and frequency of this voltage vary with a number of factors including target size, speed, and direction relative to the PIR zones, difference between ambient and target temperature, width and spacing between the detection zones, and frequency response of the pyrodetector.

Upon receiving the signals, the detector may perform processing by comparing the received signal to one or more voltage thresholds. These threshold crossings produce positive and negative pulses that can be counted and timed, with certain combinations of pulse height, duration, and frequency being considered PIR alarms.

MW technology often operates on the principle of phase shift or Doppler effect. Unlike PIR, MW technology is an active technology. The MW detector transmits MW energy, which reflects off objects and returns to the MW detector. Moving objects result in a received signal that is frequency shifted from the original transmitted signal. The detector receives this signal, and generates an alternating voltage difference frequency signal which is then processed via hardware or digital signal processing. Because only the AC (alternating current) component of the signal is processed, only moving objects are detected. The frequency of the returned signal is dependent upon the target movement direction and speed. The amplitude is a function of transmitted signal strength, target size, distance, and reflectivity. Highly reflective materials such as metal will return significantly greater energy to the detector than less reflective objects such as people or animals. Processing may include comparison of the MW signal to one or more thresholds with certain combinations of quantity, duration, or frequency of threshold crossings considered MW alarms.

Typically, dual technology detectors incorporate an AND function, whereby both individual sensor technologies must be in the alarm state simultaneously to produce an alarm at the detector output. PIR and MW technologies have many differing and distinct potential false alarm sources, as well as some common sources such as small animals. Minimization of false alarms from either detector technology is likely to greatly reduce the incidence of false alarms for the dual detector system.

MW motion detectors are susceptible to false alarms caused by small animals and insects within the detection range of the MW detector. Furthermore, many MW detectors also suffer from decreased sensitivity in the area beneath the sensor because very little MW energy is transmitted to, or can be received from that direction due to the shape of the MW transmitter and/or receiver patterns.

Some currently existing systems, such as that of U.S. Pat. No. 5,578,988 provide sensitivity adjustments for MW detection systems. However, such systems do not consider a distance of the target object from the dual detector in order to reliably minimize the probability of false alarms. A solution is needed that minimizes MW false alarm effects and improves MW detector performance by considering target location in order to enhance accuracy.

BRIEF SUMMARY OF THE INVENTION

In one aspect, a system is provided for improving false alarm immunity for a MW intrusion detector. The system may include multiple range bins for classifying MW signals including a MW alarm stage bin for determining an alarm state of the MW intrusion detector. The system may additionally include a range determination module for estimating a target range based on a state of each of the multiple range bins and a MW alarm stage bin sensitivity determination module for determining an optimal MW alarm stage bin sensitivity level based on the estimated target range. Sensitivity adjustments may include pulse threshold levels, duration, quantity, and frequency.

In another aspect of the invention, a method is provided for minimizing false alarms due to small animals and insects in a coverage area of a MW intrusion detector. The method may include determining a target range for a detected target from received MW signals. The method may additionally include adjusting an alarm threshold of a MW alarm stage bin based on the determined target range, wherein the alarm threshold is at a first level when the detected target is a short range target and second level when the target is a longer range target, such that the first level may be higher or lower than the second level.

In yet an additional aspect of the invention, a method is provided for improving false alarm immunity for a MW intrusion detector. The method may include classifying a received MW signal into a range bin and estimating a target range based on a range bin state comparison. The method may additionally include determining an optimal MW alarm stage bin sensitivity based on the estimated target range.

In another aspect of the invention, a method for increasing MW sensitivity to intruders crawling in the near vicinity, there may be a target range near the detector (perhaps 3 to 13 ft) where the alarm threshold is actually decreased below the alarm threshold for longer range targets. The reduced alarm threshold compensates for the case when there may be less sensitivity beneath the detector due to relatively weak MW power in this area due to MW transmitter and/or receiver patterns. If only higher profile targets, such as walking intruders are to be detected, this threshold can be increased to a value larger than the longer range target threshold in order to gain even greater false alarm immunity.

BRIEF DESCRIPTION OF THE DRAWINGS

The present invention is described in detail below with reference to the attached drawings figures, wherein:

FIG. 4 is a table illustrating approximate range bin configurations in accordance with an embodiment of the invention;

FIG. 6 is a table illustrating MW pulse thresholds for selected target ranges in accordance with an embodiment of the invention;

FIG. 7A is a graph illustrating MW threshold vs. target range for a first detector range in accordance with an embodiment of the invention;

FIG. 7B is a graph illustrating MW threshold vs. target range for a second detector range in accordance with an embodiment of the invention;

FIG. 7C is a graph illustrating MW threshold vs. target range for a third detector range in accordance with an embodiment of the invention; and FIG. 7D is a graph illustrating MW threshold vs. target range for a fourth detector range in accordance with an embodiment of the invention.

DETAILED DESCRIPTION OF PREFERRED EMBODIMENTS

Doppler microwave motion detectors are susceptible to undesirable alarms due to the movements of small animals and insects within the detection range. Small objects located close to the detector may produce MW return signals of comparable strength to humans located at much greater distances. Many MW detectors also suffer from decreased sensitivity beneath the sensor because very little MW energy may be transmitted in this direction, and/or the receiver may not be optimized for this direction. The invention utilizes multiple range limited MW stages configured for different ranges to determine the general range of the moving object. Based on signal levels present on these MW stages, the system determines an approximate object range. One range limited MW stage, configured to sense objects within the entire detector detection area is used to determine alarm conditions. The alarm sensitivity of this stage is adjusted based on the object range by use of a sensitivity vs. object range function that is optimized to alarm on humans and ignore small animals and insects.

Embodiments of the invention may use a Doppler MW system capable of detecting objects in various object ranges. Embodiments of the invention may also incorporate a PIR detector or other type of detector in addition to the MW detector. Multiple overlapping and progressively longer ranges of microwave detection from zero to up to 3 feet, 13 feet, 36 feet, and 60 feet could be provided. Multiple range limited MW stages are configured for different ranges to determine the general or approximate range of a moving object. For instance, the four MW stages could determine that a moving object is in the range of 36 to 60 feet.

Figure 1:
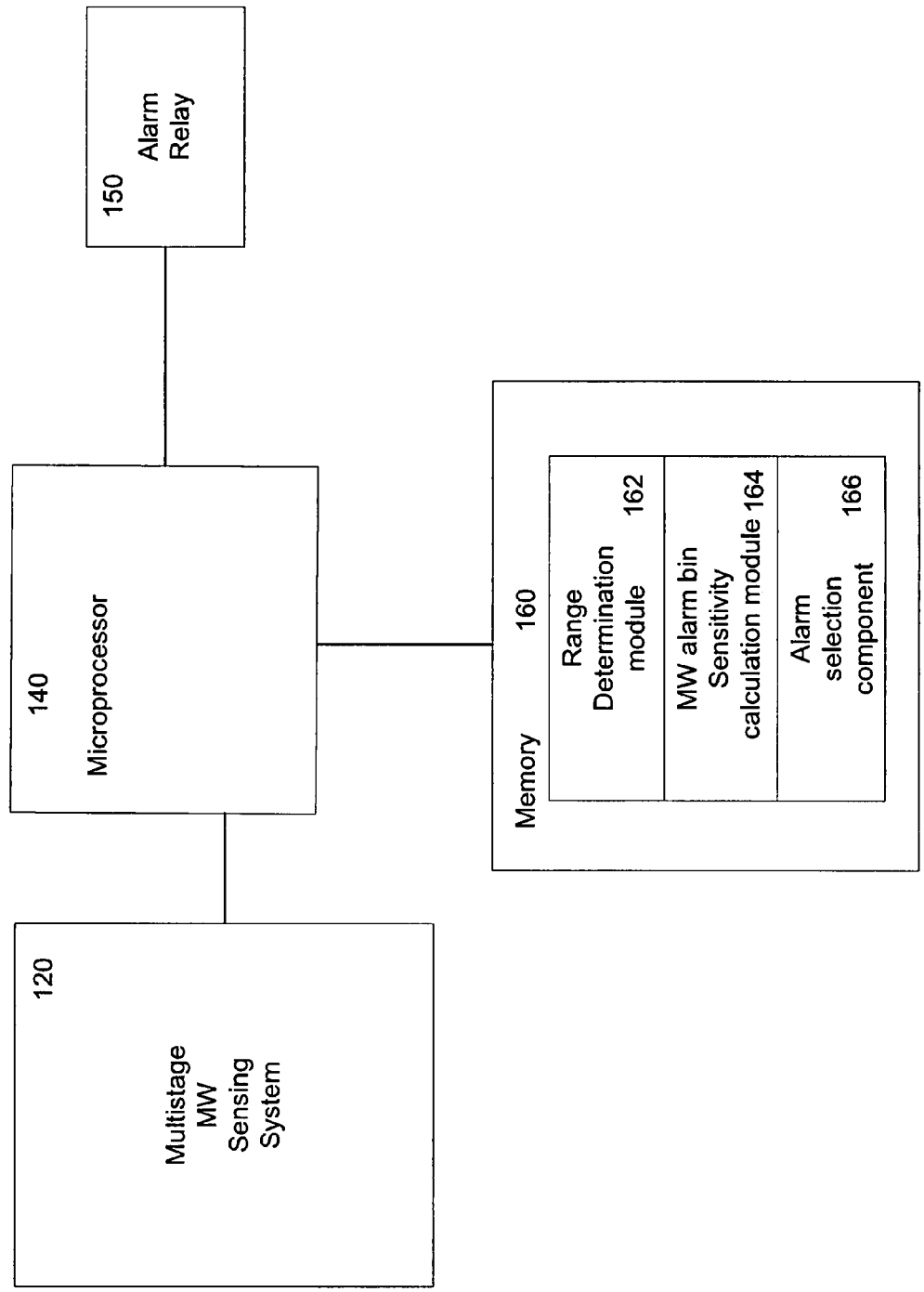
FIG. 1 is a block diagram illustrating an intrusion detection system in accordance with an embodiment of the invention.

FIG. 1 is a block diagram illustrating a MW system 100. A multi-stage MW sensing system 120 may be connected with a microprocessor 140. The microprocessor 140 may be connected with a memory 160 having modules serving multiple functions. The memory 160 may include a range determination module 162, an MW alarm stage bin sensitivity calculation module 164, and an alarm selection component 166. The microprocessor 140 may also be connected with an alarm relay 150 for triggering an intrusion alarm.

The MW sensing system 120, embodiments of which are further described below with reference to FIG. 2, may include a transceiver having transmitting and receiving antennas. The transmitting antenna transmits microwave energy generally into microwave detection space. As the microwave signals impinge on an object in MW space, at least some of the MW signals are reflected toward the receiving antenna. Depending on the characteristics of the reflected signal, the detector may generate a voltage signal that indicates the presence of a moving object.

The microprocessor 140 may include any type of microprocessor, such as a microcontroller having integral memory chips. The modules 162, 164, and 166 may be or include memory chips integral with a microcontroller. Furthermore, the functions of the modules 162, 164, and 166 may be performed by hardware components. As shown, the microprocessor 140 also may be connected with the discrete memory 160.

The memory 160 may include computer storage media in the form of volatile and/or nonvolatile memory such as read only memory (ROM) and random access memory (RAM). A basic input/output system (BIOS), containing the basic routines that help to transfer information between elements within the security system environment 100, such as during start-up, may be stored in ROM. RAM typically contains data and/or program modules that are immediately accessible to and/or presently being operated on by microprocessor 140.

The RAM may include an operating system, program data, and application programs. The application programs may be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including multiprocessor systems, microprocessor-based or programmable consumer electronics, minicomputers, mainframe computers, and the like.

Regardless of its type, the memory 160 may include firmware, hardware, or software modules that perform the function specified by the range determination module 162, the MW alarm bin sensitivity calculation module 164, and the alarm selection component 166.

The alarm relay 150 may be operable to trigger an alarm upon detecting a security violation. The alarm system may activate any appropriate type of visible or audible alarm including both remote and proximal alarms.

Figure 2:
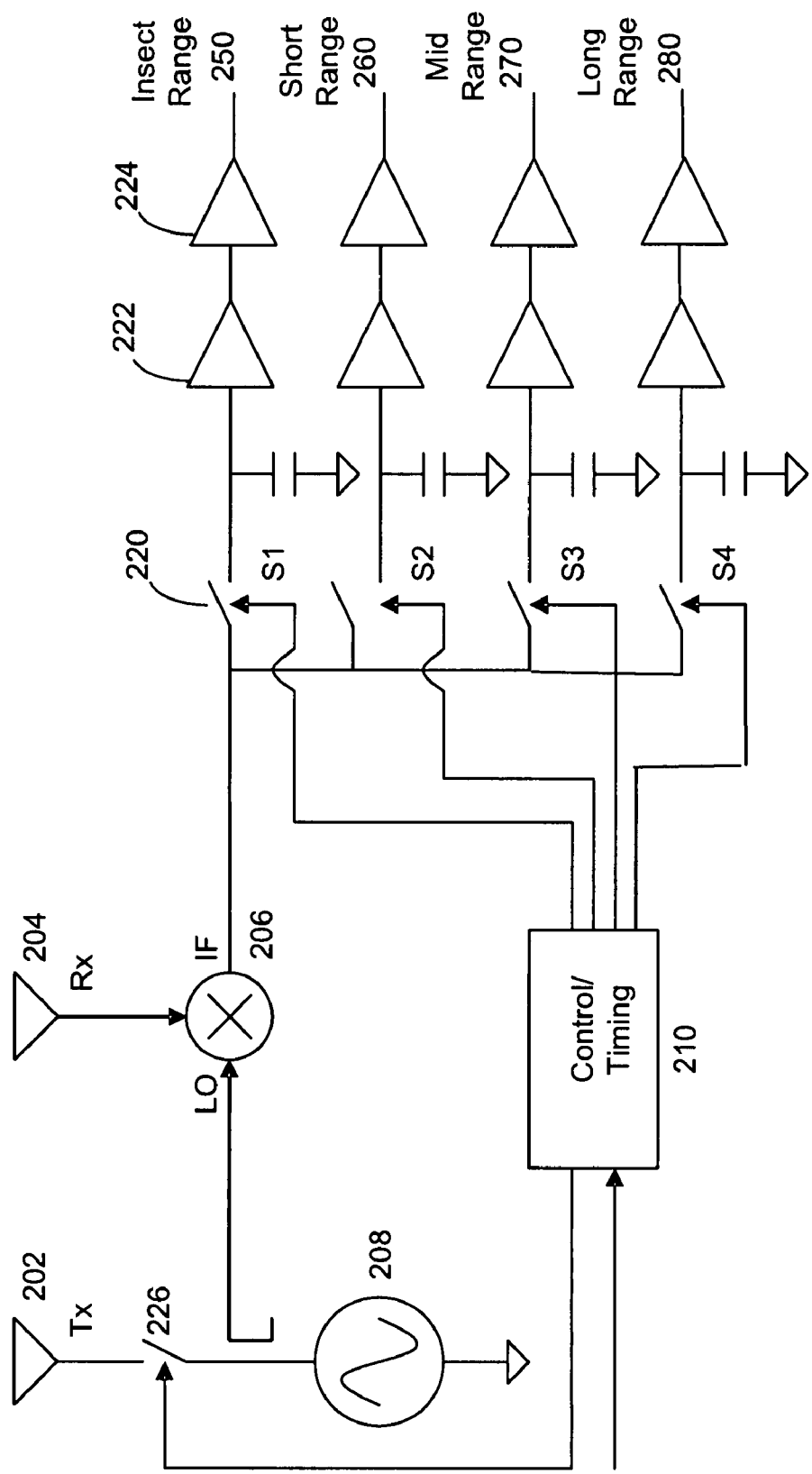
FIG. 2 is a block diagram illustrating a ranging MW detection system in accordance with an embodiment of the invention.

FIG. 2 illustrates a MW sensing system 200 in accordance with an embodiment of the invention. The system is preferably a Doppler based system that detects moving objects. The MW detection system 200 may include a transmitter including an oscillator 208, a switch 226, and a transmitting antenna 202. A receiver antenna 204 receives signals returned from a moving target and delivers the signals to a mixer 206. The mixer 206 produces IF output that may include a low frequency signal. The IF output may, for example, include a signal of frequency approximately equal to 31 Hz/mph of target radial velocity, which is the component of the target velocity vector directed toward or away from the microwave sensing system 200.

The embodiment illustrated in FIG. 2 includes four range bins 250, 260, 270, and 280. However, alternative embodiments may include as few as two bins and an unlimited number of additional bins depending upon the total target detection area. Each range bin covers a specified area beyond the detector. An insect range bin 250, a short range bin 260, a mid range bin 270, and a long range bin 280 are illustrated in FIG. 2.

Each bin 250, 260, 270, and 280 may include a sample/hold circuit and two stages of gain and filtering as illustrated by 220, 222, and 224. Each range bin second gain stage output may be applied to an A/D converter. If necessary, it may also be possible to apply the range bin first gain stages to A/D inputs. This could prove useful for signal amplitude measurement in cases when the second gain stage output(s) saturate. It would then be necessary to determine the optimal distribution of total gain between the first and second stages of each bin. Appropriate gain and filter parameters may be adjusted for a particular detector application.

In an embodiment of the invention, the insect range bin 250 detects targets in a range from zero to three feet of the detector. The insect range bin 250 may detect insects crawling on the detector or flying very near the detector. A function of the insect range bin 250 is to aid in insect immunity in order to minimize false alarms.

The short range bin 260, in accordance with an embodiment of the invention, is designed to detect targets in a range of zero to thirteen feet from the detector. The short range bin may serve to detect crawling intruders under or near the detector and also to distinguish small animals from human intruders as will be further explained below.

The mid-range bin 270 may detect targets from zero to twenty six or thirty six feet from the detector. The mid-range coverage may vary with detector range setting. The mid-range bin may also serve to distinguish small animals from human intruders.

The long range bin 280 may have a coverage dependent upon the detector range as the long range bin may cover a range from the zero to the maximum detector coverage range. For instance, the long range bin 280 may detect targets from zero to thirty, forty, fifty, or sixty feet from the detector. Ideally, in embodiments of the invention, the MW detector system 200 will enter an alarm state when an intruder enters anywhere within the range of this bin. While all of the bins 25, 260, 270, and 280 may be implemented for determining a target range, the long range bin 280 may be the only bin used for determining alarm conditions.

In operation, the transmitter 202 is gated on and the IF signal is sampled for a fixed sample time afterward. This fixed sample time is determined by the free space propagation speed of the MW energy, or 1 ft/ns. For example, it takes 40 ns for energy to reach a target at a range of 20 ft, and return to the sensor. In reality, there are other considerations that influence range and optimal sample timing as well, such as MW transmit and receive antenna pattern shapes, and transmitter 202 time response.

Figure 3:
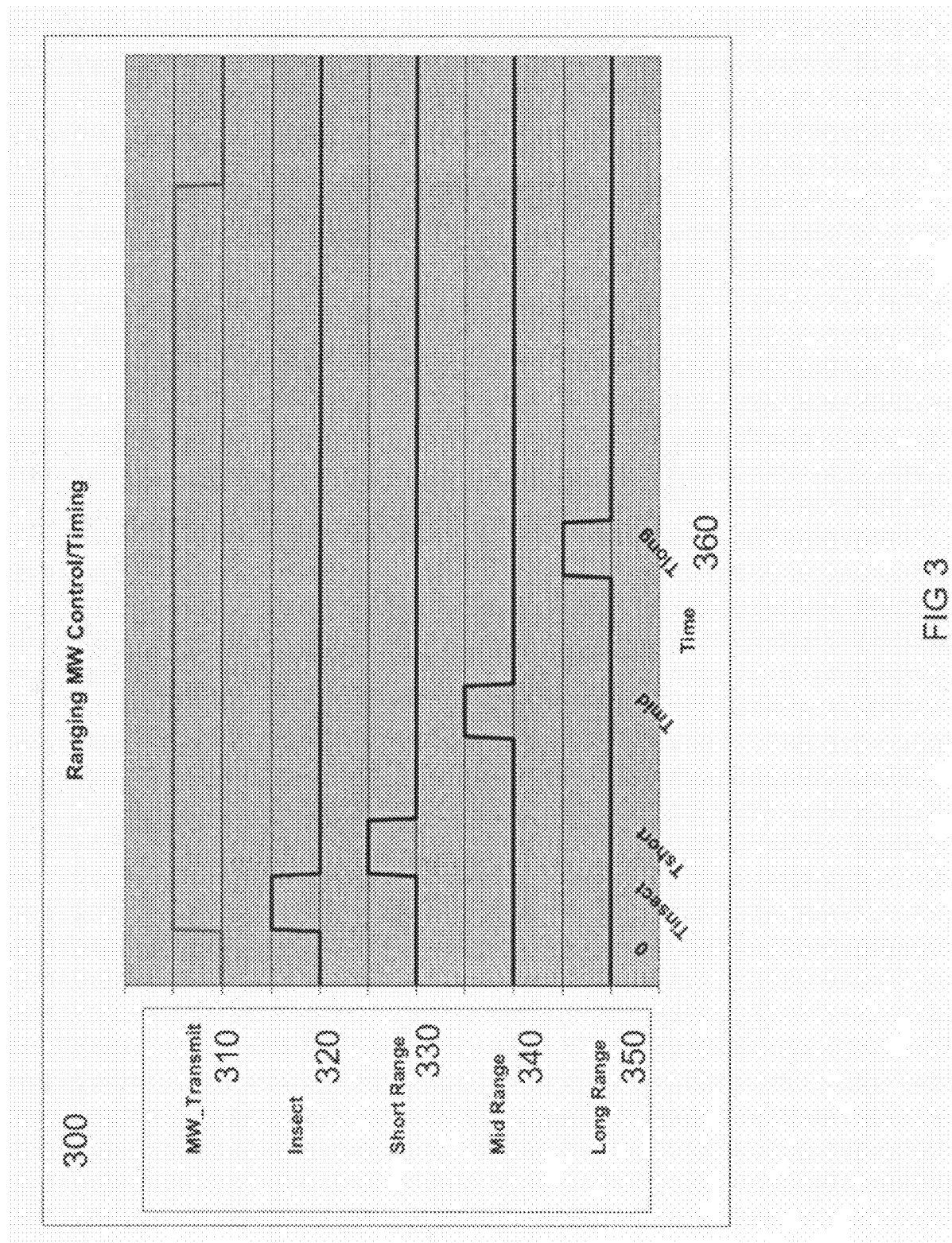
FIG. 3 is a timing diagram illustrating MW detector timing in accordance with an embodiment of the invention.

FIG. 3 is a timing diagram 300 illustrating a transmission pulse 310, and sample pulses 320, 330, 340, and 350 along the y-axis for each provided bin. The x-axis 360 represents time. Due to regulatory bandwidth requirements, as illustrated in FIG. 3, it is necessary for the MW transmissions to be very long relative to the sampling delays of the system. As a result, the MW transmitter continues to transmit during the sample periods, and long afterward, as shown by a transmission pulse 310 in the timing diagram 300. Thus, a given sample will detect moving targets within the entire area bounded by the sensor and a maximum range determined by the conclusion of the sample pulse.

The ranging MW system uses precisely timed MW transmissions and returned signal samples to limit the effective detection range of the technology. Knowing the time (t) required for the transmitted energy to travel to a target at a given distance $d_{max}$ and return to the detector also(t), it is possible to limit the range to the distance $d_{max}$ by limiting the sampling of returned energy to that received before 2×t. This requires that transmission begin at a precisely known time and that returned signal samples occur at a very precise time afterward. This results in the MW ranging system detecting targets within distance $d_{max}$ and not detecting targets beyond $d_{max}$. Sampling the returned signal at multiple intervals creates the multiple range detection bins. One precisely placed sample pulse corresponds to each range bin and the time delay between MW transmission start and end of each sample determines the maximum range of a bin.

For example, referring to the mid range bin pulse 340 on the timing diagram 360, the delay between the beginning of MW transmission (MW_Transmit rising edge) and the end of the mid range sample pulse 340 is approximately 40 nS. Thus, theoretically the mid-range sample will detect moving targets in the range of zero feet to twenty feet from the detection system.

Thus, the start of MW transmission may be followed by four precisely placed returned signal samples (one for each range bin). Each range bin detects targets between the sensor and a maximum range defined by the time between the start of transmission and the end of its associated sample pulse. FIG. 3 shows the timing of the MW transmit signal and the four range bin samples. The effective range of each bin is determined by the time difference between the start of MW Transmit and the end of the appropriate sample pulse. The placement of the sample pulses, and therefore the range of each bin, can be placed under control of user selectable switches or a microprocessor, allowing user configuration of the detector range.

FIG. 4 includes a table 400 illustrating approximate range bin configurations for each detector range configuration in accordance with an embodiment of the invention. Column 410 illustrates a detector range in accordance with four embodiments of the invention. For each detector range 410, the four provided bins 420, 430, 440, and 450 have a pre-selected bin range and a signal sample time as illustrated under each bin. For the insect bin 420, the pre-selected bin range is three feet and the signal sample time is 20 ns for each of the detector ranges. For the short range bin 430, the pre-selected bin range is thirteen feet and the signal sample time is 40 ns for each of the detector ranges. For the mid-range bin 440, the pre-selected bin range is twenty six feet and the signal sample time is 70 ns for detector ranges of thirty and forty feet. For detector ranges of fifty and sixty feet, the pre-selected bin range is thirty six feet and the signal sample time is 95 ns. For the long range bin 450, the pre-selected bin range is thirty feet and the signal sample time is 90 ns for a detector range setting of thirty feet. For a detector range setting of forty feet, the pre-selected bin range is forty feet and the signal sample time is 105 ns. For a detector range of fifty feet, the pre-selected bin range is fifty feet and the signal sample time is 130 ns. For a detector setting of sixty feet, the pre-selected bin range is sixty feet and the signal sample time is 155 ns.

Figure 5:
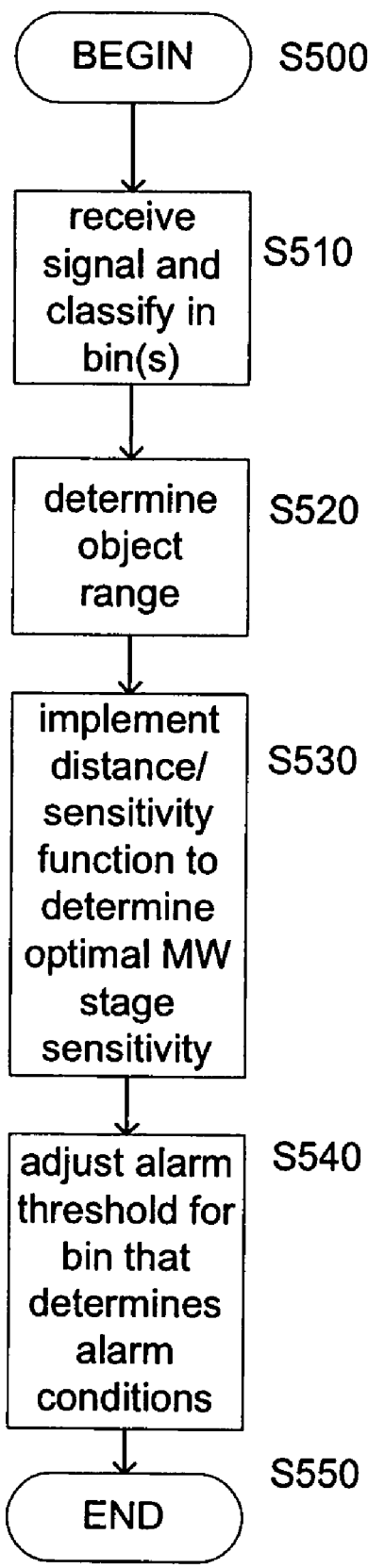
FIG. 5 is a flow chart illustrating a false alarm minimization technique in accordance with an embodiment of the invention.

FIG. 5 illustrates a method for adjusting MW long range bin sensitivity in accordance with an embodiment of the invention. The process begins in S500 and in S510 the system performs microwave detection and makes bin placements. In S520, the system implements the range determination module to determine an object range. In S530, the system implements a distance vs. sensitivity function provided by the MW alarm stage bin sensitivity calculation module to determine optimal sensitivity. Based on the optimal sensitivity, in S540, the system adjusts the MW alarm threshold for the long range or alarm stage bin that determines alarm conditions and the process ends in S550.

The MW detection and bin placement of S510 may be accomplished as set forth above. The insect, short, and mid range bins of the MW detection system aid in determining an approximate range of the target. The long range bin detects all objects within the detector coverage pattern. Each range bin detects targets located between the detector and its maximum range. It is possible to determine the general range of a target by comparing the states of the range bins. A moving target will be detected by each range bin with a maximum range greater than the target range. Accordingly, the estimation of target range of S520 can be determined to be between the maximum range of the longest range bin for which there is no detection and the maximum range of the shortest range bin for which there is detection.

For instance, using the detector parameters of FIG. 4, a target twenty three feet from the detector will generate a signal that will reach both the mid-range bin and the long range bin in S510. The signal would not be detected by the insect range bin or the short range bin. Accordingly, target range determination module can ascertain in S520 that the target range is between thirteen feet (short range bin maximum range) and thirty six feet (mid range bin maximum range) for detector ranges of fifty or sixty feet, or between thirteen feet (short range bin maximum range) and twenty six feet (mid range bin maximum range) for detector ranges of thirty or forty feet. In general, the algorithms of the range detection module operate on the principle that the insect, short range, and mid-range bin detection (and therefore the target range) determine the alarm characteristics that are compared against the long range bin signal. MW alarm decisions are made as a result of long range bin signal processing.

Step 530 of FIG. 5 requires the determination of optimal sensitivity for the long range bin that determines alarm conditions. This determination is made by the MW sensitivity calculation module 164 of FIG. 1. This determination is largely based on a sensitivity vs. object range function that addresses the problems to be solved by MW adjustment. These problems include false alarms activated by insects and small animals as well as the failure to provide an alarm in the case of intruders crawling close to the detector.

Problems with false alarms can occur if a small animal moving at appropriate speeds crosses the detection pattern at relatively close range. In many commercial settings, rats or birds are common and may be sources of false alarm potential. A small animal at short or mid range may present the same amount of sensor received power as a human intruder at a longer range. A simple Doppler MW has no means of distinguishing between two such signals, but the presently disclosed ranging system identifies the target as being close to the detector since its signal will be received in the short range and/or mid range bin.

Generally in the case of a MW detector, a small animal near the detector may produce a sufficiently large signal to cause a MW alarm. The sensitivity of the detector must be high enough to detect human intruders at the detector's maximum range. It is likely that a small animal, such as a mouse, rat, or cat near the detector may produce signals of similar frequency and amplitude as a human at a greater distance. In order to minimize these false MW alarms, it is desirable to reduce MW sensitivity for targets close to the detector, especially in areas where the MW transmitted power is strong and receiver efficiency is high. In areas where the MW sensitivity may be less, such as the vicinity beneath the detector, it may be desirable to increase MW sensitivity in order to improve catch performance with crawling intruders.

In one preferred implementation, the MW pulse thresholds for the long range bin are dynamically adjusted based upon the target range as determined by the ranging MW. Actual threshold values are largely dependent on transmitted MW power, receiver efficiency, and circuit gain, but may be similar to those shown in FIG. 6.

In the case of insects, the system aims to prevent alarms when insects fly very close to the sensor or crawl on the sensor. Insects crawling on, or flying near the sensor may produce MW energy returns comparable to human intruders at long range. In order to minimize the chances of the MW technology detecting insects near the detector, the MW technology is disabled or greatly reduced in sensitivity when the insect range bin detects a target.

One implementation for reducing false MW alarms due to insects involves ignoring the long range signal from the time the MW insect range bin detects a target until a specified time delay after the MW insect range bin clears. The time delay is to allow for MW amplifier recovery.

An additional implementation allows for reduction of long range bin alarm sensitivity by requiring a larger voltage threshold and/or larger quantity, duration, or frequency of threshold crossings to qualify as a MW alarm.

Intruders crawling beneath the detector often produce smaller MW reflections and therefore smaller returned signal amplitude than a target further from the detector. This is largely because less MW energy is transmitted below the detector and less reflected energy is actually received by the detector. In order to improve sensitivity to intruders crawling beneath the detector, it is desirable to increase the detector MW sensitivity in this area without greatly reducing small animal immunity farther away from the detector.

To address the problem of crawling intruders, when a target is recognized as being within the short range bin range but not within the insect range bin range (three to thirteen feet in range bin configuration), the MW sensitivity calculation module may enable a more sensitive detection mode for the long range bin that requires a lower threshold, fewer pulses or lower pulse frequency to be recognized as a MW alarm. For example, the MW sensitivity adjustment module might adjust the long range bin alarm threshold (illustrated in FIG. 6) in the three to thirteen feet target range to 0.5 volts.

Multiple implementations may be executed in accordance with embodiments of the invention. In one preferred embodiment of the invention, MW pulse thresholds are adjusted dynamically based upon the target range as determined by the Ranging MW. Actual threshold values are largely dependent on MW transmitter power, receiver efficiency, and circuit gain. FIGS. 6 and 7 illustrate threshold values in accordance with an embodiment of the invention.

FIG. 6 illustrates a table 600 that include multiple detector ranges 610. A long range bin threshold 630 is provided for each insect bin target range 620. A long range bin threshold 650 is provided for each short range bin target 640. A long range bin threshold 670 is provided for each mid-range bin target 660 and a long range bin threshold 690 is provided for each long range bin target 680. As illustrated, the thresholds generally increase as the target range decreases, with the exception of the threshold in the 3 to 13 ft target range, which is reduced to compensate for reduced MW sensitivity in the vicinity beneath the detector. If detection of crawling intruders in this area is not required, or if MW sensitivity in this area is increased, this threshold can be increased accordingly, perhaps to 1 volt. In order to minimize the chances of the MW technology detecting insects near the detector, the MW alarm sensitivity may be disabled or greatly reduced in sensitivity when the insect range bin detects a target.

FIGS. 7A-7D illustrate long range bin threshold vs. target range in accordance with an embodiment of the invention. FIG. 7A illustrates a graph 700 for detection within a 30 ft detector range. Along an x-axis 704, the target range is shown and along a y-axis 702, a long range bin threshold is shown. Similarly, in FIG. 7B, a graph 710 is shown for detection within a 40 ft detector range. Along an x-axis 714, the target range is shown and along a y-axis 712, a long range bin threshold is shown. In FIG. 7C, a graph 720 is shown for detection within a 50 ft detector range. Along an x-axis 724, the target range is shown and along a y-axis 722, a long range bin threshold is shown. Similarly, in FIG. 7D, a graph 730 is shown for detection within a 60 ft detector range. Along an x-axis 734, the target range is shown and along a y-axis 732, a long range bin threshold is shown. As illustrated in all of FIGS. 7A-7D, a long range bin threshold is adjusted to be high in regions near the detector and in the mid range where the MW detection sensitivity is high, and lower in more distant regions and in close regions where the MW detection sensitivity is low. If the MW detection sensitivity is higher in these regions, the thresholds could be increased accordingly.

Embodiments of the invention utilize a Doppler microwave system capable of detecting an object range by using multiple range bins and adjusting the sensitivity of the long range bin of the MW detector to account for object range. The invention utilizes multiple range limited MW stages configured for different ranges to determine the general range of the moving object. Based on signal levels present on these MW stages, an approximate object range is determined. The sensitivity of the long range bin that covers an entire detection area of the MW detector is then adjusted based on a long range MW bin sensitivity vs. object range function that is optimized to alarm on humans and ignore small animals and insects.

While particular embodiments of the invention have been illustrated and described in detail herein, it should be understood that various changes and modifications might be made to the invention without departing from the scope and intent of the invention.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

What is claimed is:

1. A microwave intrusion detector, the system comprising:
a multistage microwave sensing system configured to generate at least one output signal indicative of a presence of a moving object, the multistage microwave sensing system including multiple range bins for classifying microwave signals including a microwave alarm stage bin for determining an alarm state of the microwave intrusion detector a processor coupled to the multistage microwave sensing system to receive the at least one output signal;
a memory accessible by the processor;
a range determination module stored in the memory for execution by the processor to determine an estimated target range based on a state of each of the multiple range bins;
a microwave alarm stage bin sensitivity calculation module stored in the memory for execution by the processor to determine an optimal microwave alarm stage bin sensitivity level based on the estimated target range and an alarm relay operable to trigger an alarm based upon the alarm state indicating a security violation.

2. The system of claim 1, further comprising dynamically adjusting a microwave alarm stage bin sensitivity level to a predetermined threshold upon determination of the target range.

3. The system of claim 1, wherein the multiple range bins comprise at least a short range bin and a long range bin.

4. The system of claim 3, wherein the multiple range bins further comprise an insect range bin and a mid-range bin.

5. The system of claim 4, further comprising a long range bin that functions as the microwave alarm stage bin.

6. The system of claim 5, wherein the insect range bin is capable of detecting insects in an immediate vicinity of the intrusion detector.

7. The system of claim 6, wherein when the insect range bin detects a target, the microwave alarm stage bin sensitivity determination mechanism determines that the optimal microwave alarm stage bin sensitivity level is a low sensitivity and a microwave alarm trigger requires high amplitude pulses.

8. The system of claim 6, wherein when the insect range bin detects a target, the microwave sensitivity determination mechanism triggers a time delay, beginning at insect range bin target detection, and terminating at some fixed time after clearance of the insect range bin, wherein alarm stage bin microwave signals are ignored during the time delay.

9. The system of claim 5, wherein the short range bins detects crawling intruders under or in the vicinity of the intrusion detector.

10. The system of claim 5, wherein a target within the short range bin and not within the insect range bin triggers an increase in microwave alarm stage bin sensitivity to alarm upon detection of crawling intruders.

11. A method for minimizing false alarms due to small animals and insects in a coverage area of a microwave intrusion detector system, the method comprising:
providing a multistage microwave sensing system configured to transmit and receive microwave signals, the received microwave signals being indicative of a detected target, the multistage microwave sensing system including multiple range bins for classifying the received microwave signals, the multiple range bins including a microwave alarm stage bin to determine an alarm state of the microwave intrusion detector system;
providing a processor coupled to the multistage microwave sensing system;
determining a target range for a detected target from received microwave signals with the processor;
adjusting an alarm threshold of the microwave alarm stage bin with the processor based on the determined target range, wherein the alarm threshold is at a first level when the detected target is a short range target and second level when the target is a longer range target, such that the first level may be higher or lower than the second level depending on MW sensitivity in a short range and a long range and triggering an alarm based upon the alarm state indicating a security violation.

12. The method of claim 11, further comprising dynamically adjusting the microwave alarm stage bin sensitivity to a predetermined sensitivity upon determination of the target range.

13. The method of claim 11, further comprising determining whether to trigger an alarm based on the state of the microwave alarm stage bin.

14. The method of claim 11, wherein determining the target range comprises providing multiple range bins for the microwave sensing system.

15. The method of claim 14, further comprising providing an insect range bin capable of detecting insects in an immediate vicinity of the intrusion detector.

16. The method of claim 15, further comprising adjusting microwave alarm stage bin sensitivity to a low sensitivity when the insect range bin detects intrusion, such that the microwave alarm stage bin requires high amplitude pulses to trigger an alarm.

17. The method of claim 15, further comprising, when the insect range bin detects a target, triggering a time delay, beginning at insect range bin target detection, and terminating at some fixed time after clearance of the insect range bin, wherein alarm stage bin microwave signals are ignored during the time delay.

18. The method of claim 15, further comprising providing a short range bin for detection of crawling intruders under or in the near vicinity of the intrusion detector.

19. The method of claim 18, further comprising triggering an increase in microwave alarm stage bin sensitivity upon detection of a target within the short range bin and not within the insect range bin to facilitate detection of crawling intruders.

20. A method for improving false alarm immunity for a microwave intrusion detector, the method comprising:
providing a multistage microwave sensing system configured to transmit and receive microwave signals, the received microwave signals being indicative of a detected target, the multistage microwave sensing system including multiple range bins, the multiple range bins including a microwave alarm stage bin to determine an alarm state of the microwave intrusion detector system;
providing a processor coupled to the multistage microwave sensing system;
classifying a received microwave signal into a range bin with the processor;
estimating a target range based on a range bin state comparison;
determining an optimal microwave alarm stage bin sensitivity based on the estimated target range and triggering an alarm based upon the alarm state indicating a security violation.

21. The method of claim 20, further comprising dynamically adjusting the microwave alarm stage bin sensitivity level to a predetermined threshold upon determination of the target range.

22. The method of claim 20, further comprising providing an insect range bin capable of detecting insects in an immediate vicinity of the intrusion detector.

23. The method of claim 22, further comprising adjusting the microwave alarm stage bin threshold to a low sensitivity when the insect range bin detects intrusion, such that a microwave alarm trigger requires high amplitude pulses.

24. The method of claim 22, further comprising, when the insect range bin detects a target, triggering a time delay, beginning at insect range bin target detection, and terminating at some fixed time after clearance of the insect range bin, wherein alarm stage bin microwave signals are ignored during the time delay.

25. The method of claim 22, further comprising providing a short range bin for detection of crawling intruders under or in the near vicinity of the intrusion detector.

26. The method of claim 25, further comprising triggering an increase in microwave alarm stage bin sensitivity upon detection of a target within the short range bin and not within the insect range bin to facilitate detection of crawling intruders.

27. The method of claim 20, further comprising designating a long range bin covering the entire detector area as a microwave alarm stage bin.

28. The method of claim 27, further comprising adjusting long range bin sensitivity based on a sensitivity and object range function that is optimized for triggering an alarm based on human detection and avoiding alarms based on detection of insects and small animals.

* * * * *